(12) United States Patent
Dowd et al.

(10) Patent No.: US 9,207,821 B2
(45) Date of Patent: Dec. 8, 2015

(54) PRESSURE SENSOR FOR TOUCH INPUT DEVICES

(71) Applicant: Adobe Systems Incorporated, San Jose, CA (US)

(72) Inventors: Geoffrey Dowd, San Francisco, CA (US); Way Chet Lim, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 302 days.

(21) Appl. No.: 13/855,997

(22) Filed: Apr. 3, 2013

(65) Prior Publication Data
US 2014/0300585 A1 Oct. 9, 2014

(51) Int. Cl.
G09G 5/00 (2006.01)
G06F 3/044 (2006.01)
G06F 3/041 (2006.01)

(52) U.S. Cl.
CPC .............. *G06F 3/044* (2013.01); *G06F 3/0416* (2013.01); *G06F 2203/0381* (2013.01)

(58) Field of Classification Search
CPC . G06F 3/0334; G06F 3/0354; G06F 3/03545; G06F 3/044; G06F 3/0416; G06F 2203/0381
USPC ........................................ 345/179; 178/19.04
See application file for complete search history.

(56) References Cited

U.S. PATENT DOCUMENTS

| | | |
|---|---|---|
| D294,263 S | 2/1988 | Rodgers et al. |
| D327,476 S | 6/1992 | Valls et al. |
| D342,652 S | 12/1993 | Wensley et al. |
| D419,043 S | 1/2000 | Staton |
| D419,541 S | 1/2000 | Kawashima |
| D433,888 S | 11/2000 | Choi |
| D457,402 S | 5/2002 | Heck et al. |
| D472,924 S | 4/2003 | Pan |
| D522,579 S | 6/2006 | Sim |

(Continued)

FOREIGN PATENT DOCUMENTS

WO WO9320536 A1 10/1993

OTHER PUBLICATIONS

WSJ Staff; Samsung Unveils Tablet, Readies Phone; The Wall Street Journal; Digits Technology News and Insights; Feb. 25, 2013; 4 pages.

(Continued)

*Primary Examiner* — Jennifer Nguyen
(74) *Attorney, Agent, or Firm* — Shook, Hardy & Bacon, L.L.P.

(57) ABSTRACT

A stylus and sensor capable of determining levels of pressure applied to a tip are disclosed. The stylus has a tip configured to interact with and receive a force from a touch surface. The stylus includes a force sensitive resistor configured to vary resistance in an electrical circuit based on the force and a component for determining an amount of pressure corresponding to the force or a change in pressure based on the resistance in the electrical circuit. The stylus can have a chamber housing a slide-able plunger connected to the tip, the plunger being adapted to move in directions perpendicular or tangential to the surface when the force is applied. The resistor is disposed at an end of the chamber. The stylus can have a conductive strip on the resistor and a disc on the strip. The disc is configured to compress when force is applied by the plunger.

16 Claims, 9 Drawing Sheets

(56) References Cited

U.S. PATENT DOCUMENTS

| | | |
|---|---|---|
| D523,709 S | 6/2006 | Knox |
| D537,309 S | 2/2007 | Wang |
| D547,141 S | 7/2007 | Shan |
| D557,086 S | 12/2007 | Lipscomb et al. |
| D585,489 S | 1/2009 | Han |
| D615,588 S | 5/2010 | Hillemann |
| D615,589 S | 5/2010 | Hillemann |
| D628,031 S | 11/2010 | Stokes et al. |
| D628,032 S | 11/2010 | Stokes et al. |
| D630,067 S | 1/2011 | Block et al. |
| D640,106 S | 6/2011 | Molina et al. |
| D641,755 S | 7/2011 | Rashid et al. |
| D642,032 S | 7/2011 | Molina et al. |
| D681,038 S | 4/2013 | Tomohiro |
| 8,878,823 B1 * | 11/2014 | Kremin et al. ............... 345/179 |
| 2001/0001430 A1 | 5/2001 | Ely et al. |
| 2006/0001654 A1 | 1/2006 | Smits |
| 2008/0046425 A1 | 2/2008 | Perski |
| 2008/0169132 A1 | 7/2008 | Ding et al. |
| 2009/0175491 A1 | 7/2009 | Charpentier |
| 2009/0251432 A1 | 10/2009 | Wang et al. |
| 2010/0131675 A1 | 5/2010 | Pan |
| 2010/0164434 A1 | 7/2010 | Cacioppo et al. |
| 2012/0079578 A1 | 3/2012 | Dachiraju et al. |
| 2012/0105362 A1 | 5/2012 | Kremin et al. |
| 2013/0234999 A1 * | 9/2013 | Kuno ........................... 345/179 |
| 2014/0188978 A1 | 7/2014 | Ng et al. |
| 2014/0253467 A1 | 9/2014 | Hicks et al. |

OTHER PUBLICATIONS http://www.tenonedesign.com/connect.php; last accessed on Apr. 3, 2013.

Non-Final Office Action dated May 7, 2015 in U.S. Appl. No. 13/856,070, 13 pages.

U.S. Appl. No. 29/453,913, Notice of Allowance mailed Sep. 5, 2013, 9 pages.

Restriction Requirement dated Mar. 3, 2015 in U.S. Appl. No. 29/467,046, 6 pages.

Notice of Allowance dated May 21, 2015 in U.S. Appl. No. 29/467,046, 5 pages.

Non-Final Office Action dated Sep. 18, 2014 in U.S. Appl. No. 13/835,959, 21 pages.

Final Office Action dated Feb. 12, 2015 in U.S. Appl. No. 13/835,959, 23 pages.

Pre-Interview Communication dated Jun. 26, 1205 in U.S. Appl. No. 13/840,746, 6 pages.

* cited by examiner

PRESSURE SENSOR FOR TOUCH INPUT DEVICES

TECHNICAL FIELD

This disclosure relates generally to electronic computing devices and more particularly relates to pressure sensitive input devices used with touch screen computing devices.

BACKGROUND

Conventional touch screen computing devices have been configured to identify the positioning and/or movement of one or more fingers or other objects on or near touch surfaces of the devices. For example, touch screens associated with some touch computing devices have been configured for receiving input via finger gestures and to perform one or more functions in response to those finger gestures. Certain touch screen computing devices can receive input from input devices such as stylus devices. A stylus is a writing, drawing, or pointing instrument or utensil that is generally configured to be hand held and, in the context of touch screen computing devices, used to interact with a touch surface. For example, touch screen computing devices have identified input based on one end of the stylus moving on or near the touch surface of the computing device. Styluses (or styli) have been used with personal digital assistant devices, tablet computing devices, smart phones, and other touch screen computing devices for handwriting, drawing, selecting icons, and providing other forms of input to such touch computing devices.

There are three general categories of stylus devices: active styli, pressure sensitive styli, and 'dumb' styli. Dumb styli have no internal electronic components, no batteries, and typically only have a capacitive rubber tip at an end of a pen-shaped body. Such styli are unable to detect amounts or levels of pressure applied via their tips onto a display of a touch computing device. Active styli are self-contained systems designed to work with specific, usually proprietary, touch computing devices. Active styli may include radios or other means to communicate with a particular touch device/platform and are typically limited to working with a proprietary touch screen interface of a closed, proprietary system. Such active styli are constrained to working with a given platform because other, third party touch computing platforms and devices will not recognize these closed-system styli as valid input devices.

In contrast to active styli, pressure sensitive styli are often designed to work with third party touch screens and touch computing devices not made by the manufacturer of such styli. Example pressure sensitive styli are described in more detail in U.S. patent application Ser. No. 13/572,231 entitled "Multifunctional Stylus", filed Aug. 10, 2012, which is incorporated by reference herein in its entirety. The tips of pressure sensitive may include pressure-sensitive elements. Pressure sensitive styli seek to provide multiple levels of pressure sensitivity, which can be useful in drawing, graphics, and other touch-based applications. For example, pressure sensitive styli can be used to sketch a drawing and provide other touch inputs to applications such as Adobe® Ideas®, Adobe® Illustrator®, Adobe® Photoshop® Touch, and Adobe® Photoshop® executing on various touch computing devices and platforms such as tablet computing devices and smart phones.

Input devices that are capable of sensing or detecting more levels of pressure can be used to provide more types of controls, data, gestures, and other inputs to touch computing devices and touch-based applications. Such pressure sensitivity can be achieved via use of pressure sensitive tips and sensors. Prior solutions involved incorporating a number of complex moving parts and sensitive components into styli, making such styli susceptible to damage. The fragility of such input devices can decrease their reliability and durability, particularly in mobile environments.

Incorporating traditional pressure sensors into styli can require that styli tips and bodies be wider than traditional writing and drawing instruments, such as pens and pencils, which do not ergonomically enhance their use as styli and may cause discomfort during extended periods of use. Traditional techniques for detecting pressure or force are limited in terms of a number of levels of pressure sensitivity that can be detected. Such techniques limit the sensitivity of styli, thereby limiting the types of inputs and gestures styli can produce. Some techniques for sensing force or detecting levels of pressure include using sound pressure or a plastic disc as part of a stylus tip. Such techniques can disrupt a capacitive connection needed to interact with a touch surface, such as a capacitive touch screen, of a touch computing device.

SUMMARY

Disclosed herein are touch input devices configured to detect pressure levels using a pressure sensor. Methods for detecting levels of pressure or force applied in a touch computing system using a pressure sensitive tip and a pressure sensor mechanism in the input device are disclosed.

According to one exemplary embodiment, an input device has a tip configured to deform in response to a mechanical force applied at a touch surface of a computing device. The input device includes a plunger connected to the tip and positioned within a chamber in the input device, the plunger exhibiting electrical conductivity, wherein the plunger is configured to transfer at least a portion of the force by moving within the chamber in response to deformation of the tip. The input device also includes a disc in contact with the plunger at an end of the plunger distal from the tip, the disc exhibiting resiliency and electrical conductivity, the disc configured to compress in response to movement by the plunger. The input device has a force sensitive resistor disposed at an end of the chamber that is distal from the tip, a conductive strip disposed between the disc and the force sensitive resistor, and circuitry configured to measure a degree of the force based at least in part on a change in output voltage of a circuit completed by the plunger, the disc, the force sensitive resistor, and the conductive strip in response to compression of the disc.

In another exemplary embodiment, a pressure sensor for measuring a level of pressure applied by a mechanical force includes a plunger connected to a tip and positioned within a cylinder, the plunger exhibiting electrical conductivity, wherein the plunger is configured to transfer at least a portion of the force by moving within the chamber in response to deformation of a hollow tip. The pressure sensor has a disc in contact with the plunger at an end of the plunger distal from the tip, the disc exhibiting resiliency and electrical conductivity, the disc configured to compress in response to movement by the plunger. The pressure sensor comprises a force sensitive resistor disposed at an end of the cylinder distal from the tip and a conductive strip disposed between the disc and the force sensitive resistor. The pressure sensor further comprises circuitry configured to measure a degree of the force based at least in part on a change in electrical resistance exhibited by a circuit completed by the plunger, the disc, the force sensitive resistor, and the conductive strip in response to compression of the disc.

According to another exemplary embodiment, a method for detecting a level of pressure applied by an input device includes determining transferring at least a portion of the force from a tip to a pressure sensor, the tip being connected to a plunger disposed within a chamber having a resilient disc disposed at an end of the chamber that is distal from the tip, the plunger being configured to move within the chamber to compress the disc in response to the force being applied to the tip. The transferring comprises deforming the tip, thereby moving the plunger to moving causes pressing, by the plunger, on an elastic disc at an end of a chamber distal from the tip. The exemplary method compresses the disc in response to the pressing, thereby changing the resistance of a circuit including: a force sensitive resistor disposed on a side of the disc opposite from the plunger; and a conductive strip disposed between the resistor and the disc, the strip conducting electricity to circuitry for measuring a level of the force in terms of electrical resistance exhibited by the resistor in response to the compressing.

In yet another exemplary embodiment, a stylus includes a pressure sensitive tip configured to interact with a touch surface of a computing device, the tip being at an end of the stylus. The stylus has a body encased in a body housing and a nozzle assembly coupled to the body, the nozzle assembly including a substantially cylindrical chamber housing a slideable plunger connected to the tip at the end of the stylus, the plunger being adapted to move in directions substantially perpendicular or tangential to the surface of the computing device when a force is applied to the tip. The stylus also has a pressure sensor including: a force sensitive resistor disposed on a nonconductive surface at an end of the chamber that is distal from the tip, a side of the force sensitive resistor facing the chamber, the force sensitive resistor being configured to exhibit a change in its resistance in response to a change in mechanical pressure applied thereto; a conductive strip disposed on the side of the force sensitive resistor facing the chamber, the conductive strip being electrically connected to the body housing; a disc disposed on the conductive strip such that a surface of the disc is facing the chamber, the disc comprising an electrically conductive, resilient material configured to deform in response to pressure applied by the plunger onto the surface of the disc.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented. The structure and operation of various embodiments are described in detail below with reference to the accompanying drawings. Such embodiments are presented herein for illustrative purposes only. Additional embodiments will be apparent to persons skilled in the relevant art(s) based on the teachings contained herein.

BRIEF DESCRIPTION OF THE FIGURES

Exemplary embodiments are best understood from the following detailed description when read in conjunction with the accompanying drawings. It is emphasized that, according to common practice, the various features of the drawings are not to scale. On the contrary, the dimensions of the various features may be arbitrarily expanded or reduced for clarity. Included in the drawings are the following figures.

Figure 1:
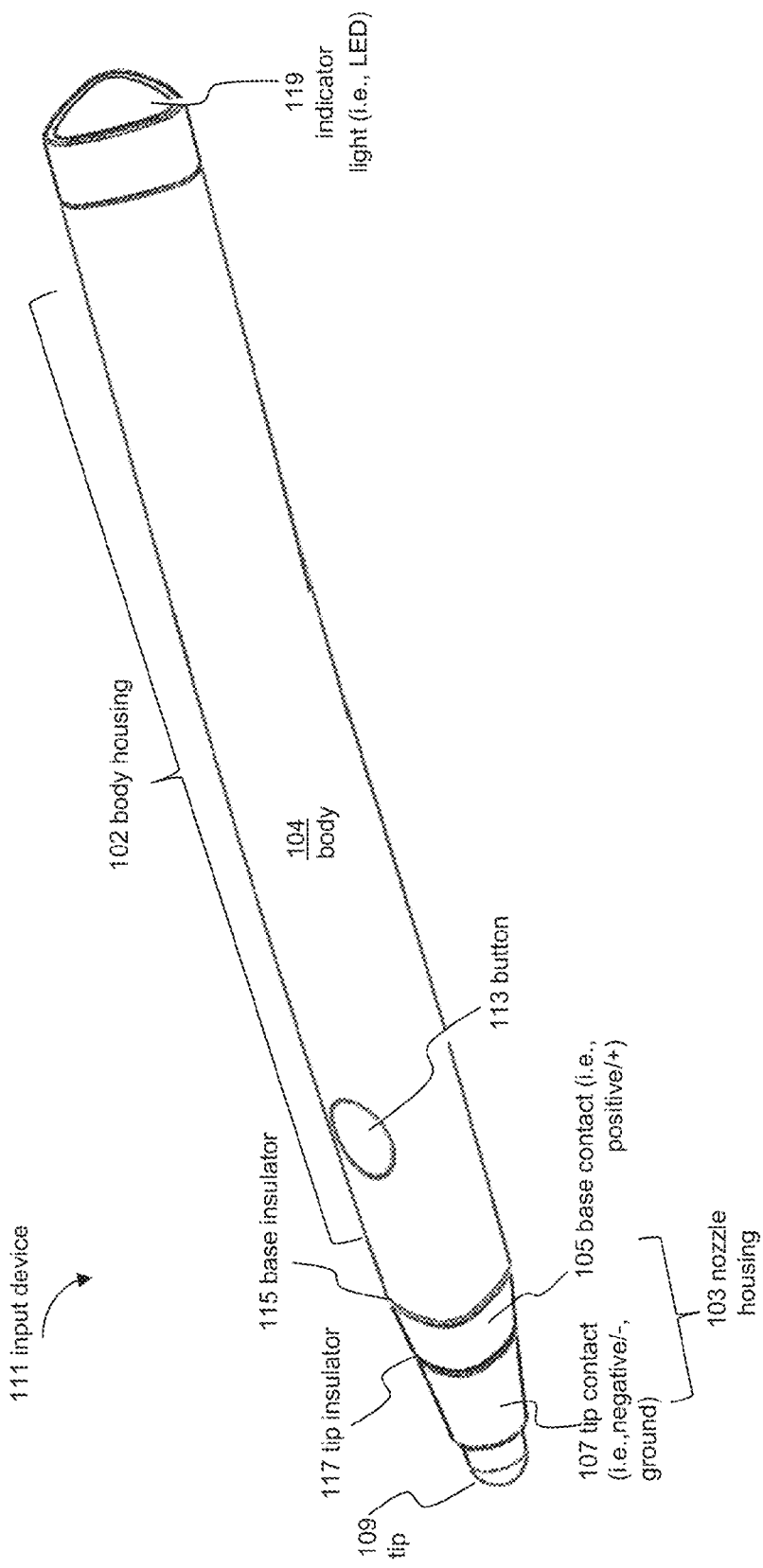
FIG. 1 provides a perspective view of an input device, according to certain embodiments.

Embodiments of the present invention will now be described with reference to the accompanying drawings. In the drawings, generally, common or like reference numbers indicate identical or functionally similar elements. Additionally, generally, the left-most digit(s) of a reference number identifies the drawing in which the reference number first appears.

DETAILED DESCRIPTION

Sensors and methods are disclosed for determining a level of pressure applied to a tip of an input device, such as a multifunctional stylus. Exemplary pressure sensors for measuring levels of pressure applied to a tip, such as a tip of a stylus in contact with a capacitive touch surface, are disclosed As used herein, the term "pressure" refers to the effect of a mechanical force applied to a surface. Pressure can be quantified as the amount of force acting per unit area. That is, pressure is the ratio of force to the area over which that force is distributed. Pressure is force per unit area applied in a direction perpendicular to the surface of an object. In the context of touch computing devices, pressure can be measured as force per unit area applied in a direction substantially perpendicular or tangential to a touch surface of a touch computing device. In the context of a stylus used with touch computing devices, pressure can be measured as force per unit area applied in a direction substantially perpendicular or tangential to the elongate body of the stylus. For example, a level of pressure can be measured in terms of force per unit area applied to a stylus tip by a touch screen in response to the tip coming into contact with and being pressed onto the touch screen.

One exemplary embodiment includes an input device such as a stylus. The stylus is configured to interact with one or more touch computing devices and includes a tip at one end of the stylus, the tip being configured to interact with a touch surface of a computing device. The stylus is capable of measuring a change in force applied to the tip when either increased or decreased force is being applied via physical contact between the tip and a touch surface of a touch computing device. In one non-limiting embodiment, the tip is a capacitive tip. In an alternative embodiment, the stylus can have a non-capacitive tip.

A force sensitive resistor may be used to vary resistance in an electrical circuit based on the amount of force received at the tip of the stylus. The amount of force or a change in the amount of force can then be determined based on the resistance in the electrical circuit. The force sensitive resistor need not be located proximate to the tip and force can be transferred from the tip to the force sensitive resistor using one or more additional components. A plunger may be used to transfer force from the tip to the force sensitive resistor. The plunger may also be used to ground the tip to an elongated housing portion of the stylus (e.g., to electrically connect the user's hand with the tip to enable the capacitive touch capability at the tip). The plunger can be electrically isolated from other components adjacent to the tip. For example, a nozzle at the tip may include one or more charging contacts that are electrically isolated from the plunger, tip, and pressure sensitive resistor. In one specific example, the plunger extends through a chamber such that it does not touch the one or more charging contacts or any associated components. Accordingly, features used in disclosed herein may be used in various combinations to provide one or more of the following benefits. First, certain features may facilitate measuring the force (and thus pressure) applied to a tip of a stylus or other input device. Second, certain features may provide electrical connectivity between a tip and an elongated housing to enable touch capacitive capabilities. Third, certain features may provide transfer force and/or electrical connectivity from a tip to sensing components located within the elongated body without electrically connecting to nozzle charging contacts and/or other components located between the tip and the elongated housing.

In embodiments, levels or amounts of pressure are measured by a stylus having a capacitive tip configured to transfer at least a portion of the force to a pressure sensor by deforming and moving a plunger in response to the tip being pressed onto a capacitive touch surface. Movement of the plunger compresses a resilient, conductive disc that is electrically connected, via a conductive strip, to a pressure sensor comprising a force sensitive resistor. The force sensitive resistor is configured to respond to an increase in force transferred by the plunger and applied by compression of the disc by exhibiting a decrease in resistance. That is, when the disc compresses, it causes the adjacent, relatively thin conductive strip to press on a surface of the force sensitive resistor, which then exhibits increased conductivity (i.e., decreased resistance). The level of pressure corresponding to this increased pressure applied to the tip can be measured in terms of the decreased resistance exhibited by the force sensitive resistor (i.e., in terms of ohms). In other words, output voltage of a circuit including the force sensitive resistor increases when increasing force is applied to the tip and transferred to the force sensitive resistor via the plunger-disc mechanism. Conversely, output voltage of a circuit including the force sensitive resistor decreases as force is decreased as a result of the decreasing force on the tip (i.e., as the tip is lifted away from the touch surface), thus causing the resilient disc to expand and push the plunger away from the force sensitive resistor. In this way, the force sensitive resistor acts as a measuring resistor for changes in pressure levels. The force sensitive resistor may comprise layers of materials having an aggregate thickness of about 0.3 mm. The layers of materials can comprise at least two substrates separated by an air gap such that when the air gap decreases, the force sensitive resistor exhibits reduced resistance (i.e., becomes a better conductor). For example, when the disc expands in response to a force applied via the tip-plunger assembly, the conductive strip between the disc and the force sensitive resistor presses on the force sensitive resistor, the air gap between the at least two substrates diminishes, thus reducing the resistance exhibited by the force sensitive resistor. In non-limiting embodiments, the force sensitive resistor can be embodied as Force Sensing Resistor® (FSR®) from Interlink Electronics Inc.

An exemplary pressure sensor may be configured to measure increases and decreases in pressure as described below.

Figure 4:
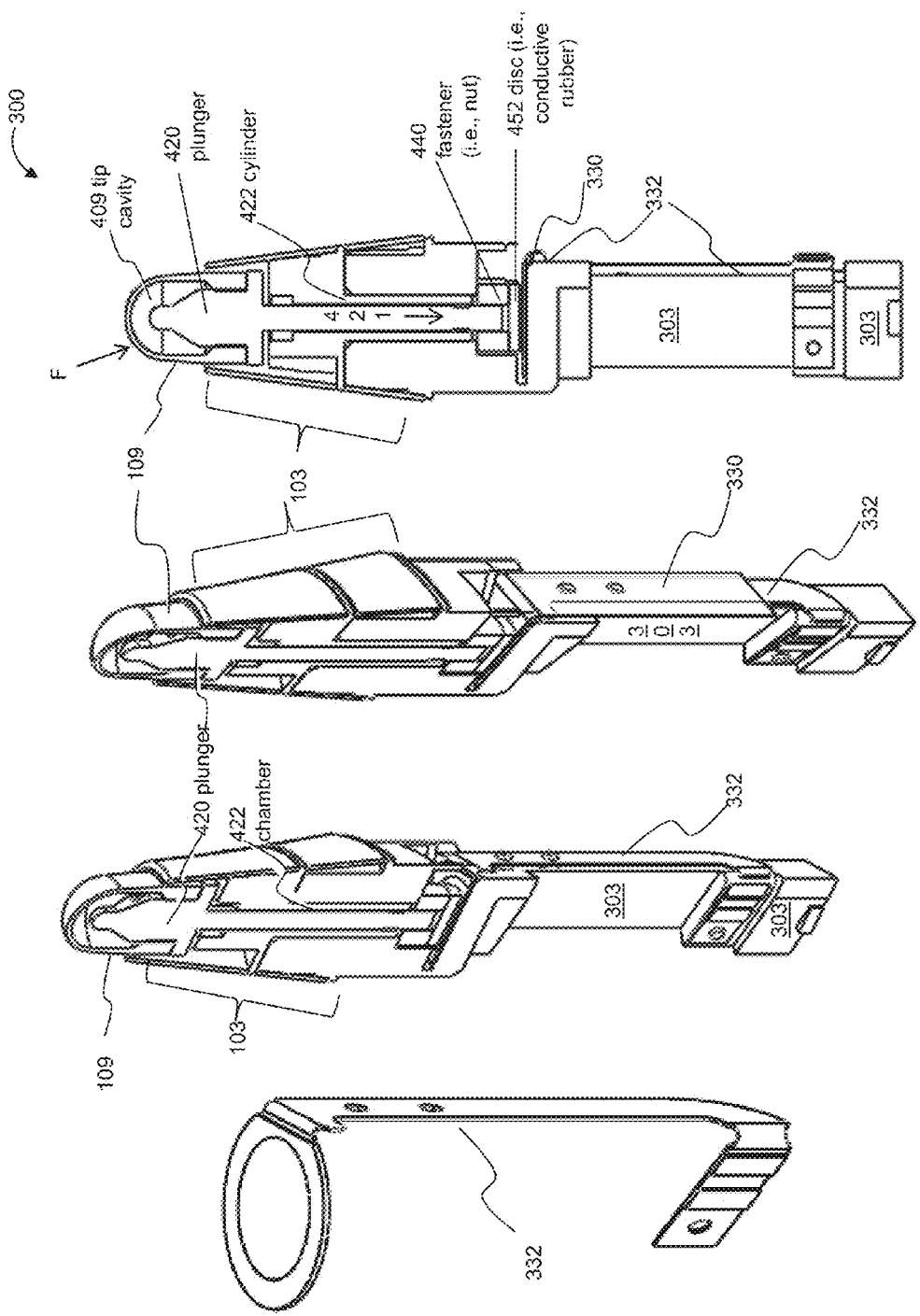
Figure 5:
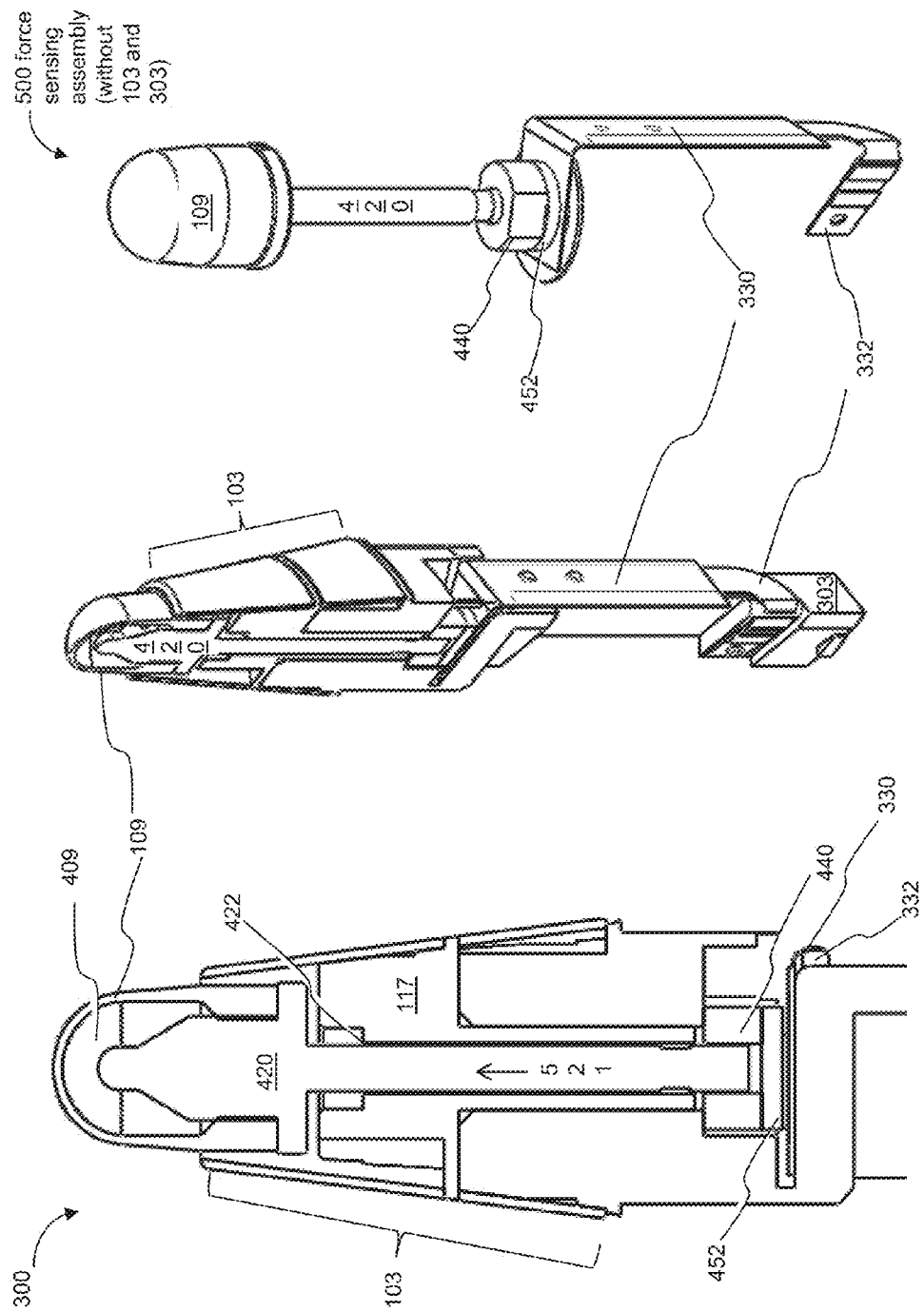
Figure 7:
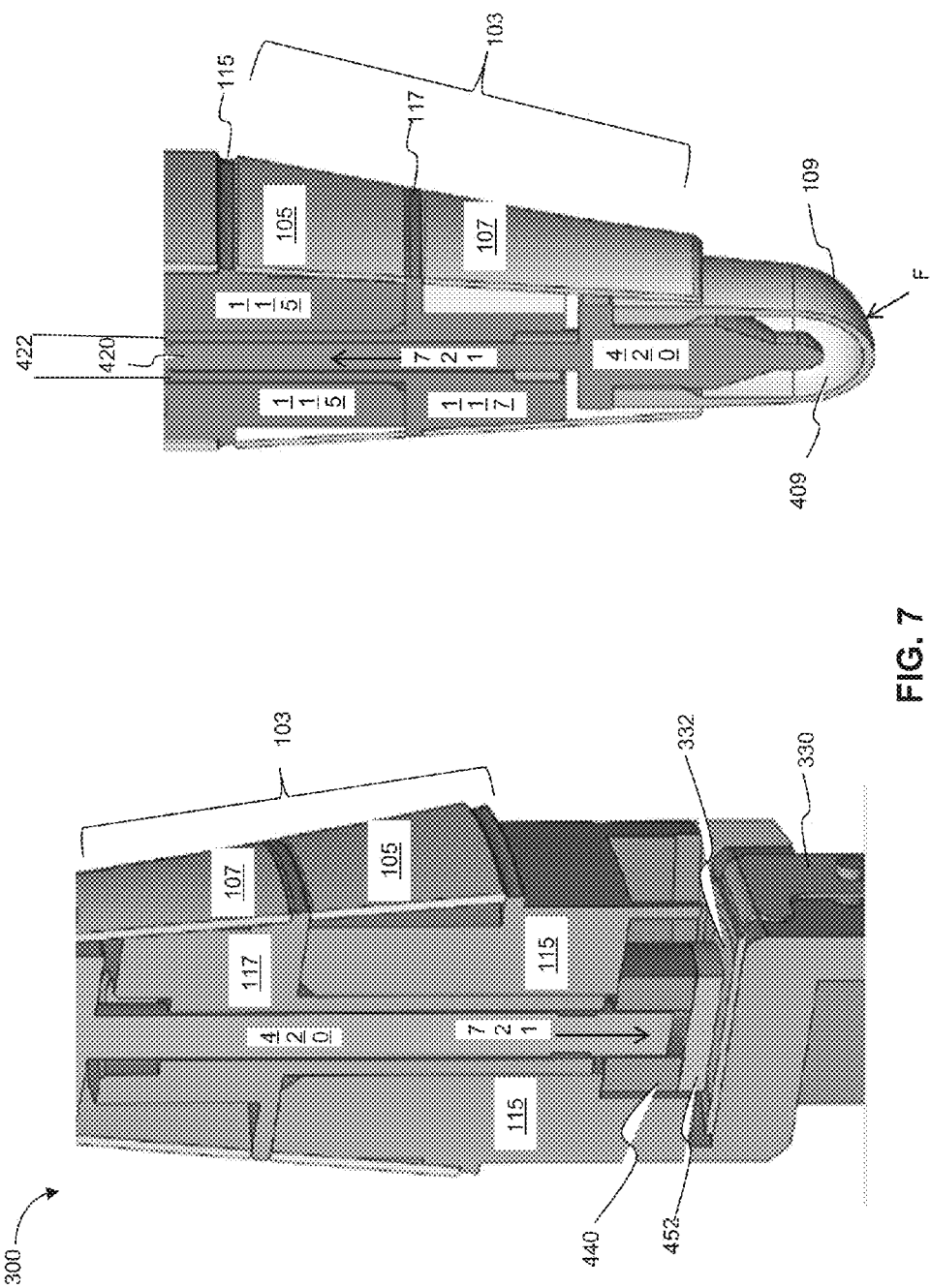
FIG. 7 provides detailed cross-sectional views of pressure sensor in FIGS. 3-5 within an exemplary input device.

For example, the force sensitive resistor exhibits decreasing levels of electrical resistance (i.e., decreased resistance measured in terms of ohms) as increasing levels of force are applied to the stylus tip. According to embodiments, an increase in applied force occurs when a force applied to the stylus tip (i.e., resulting from the tip being pressed onto a touch screen) causes deformation of the tip, which in turn moves the plunger towards the disc, thus compressing the disc. Compression of the disc transfers at least a portion of the force to the force sensitive resistor. As shown in FIGS. 4, 5 and 7, the force sensitive resistor is in close proximity to, and electrically connected to the disc. In the embodiments discussed below with reference to FIGS. 4, 5, and 7, a relatively thin film or sheet of conductive material is disposed between the disc and the force sensitive resistor. The conductive strip is sufficiently thin and pliable to allow transfer of at least a portion of the force from the compressed disc. The force sensitive resistor reacts to this transferred force, which represents an increase in an applied force, by exhibiting increased conductivity (e.g., decreased resistance).

Conversely, the force sensitive resistor provides a different response (i.e., increased resistance) when decreasing levels of force are applied to the stylus tip. For example, if a stylus tip is lifted from a touch surface after having been previously pressed into the surface, the compressed disc will expand and decompress in an attempt to return to its shape prior to application of the previous force (via the previous pressing). Due to its resilient properties and elastic properties of the tip, the disc expansion will push the plunger along the chamber (i.e., a cylinder) towards the, tip which will then begin to return to its pre-deformation shape. As the plunger moves away from the disc (i.e., towards the tip) the level of force on force sensitive resistor decreases as compared to the previously applied level of force. The force sensitive resistor reacts to this decreased force level by exhibiting decreased conductivity (e.g., increased resistance).

By measuring an output voltage of a circuit including components of the exemplary pressure sensors disclosed herein, one of over a thousand of pressure levels can be determined. This is achieved in part by measuring the output voltage, which can indicate over a thousand of minute, discrete resistance changes exhibited by the force sensitive resistor.

In embodiments, a current pressure level and pressure status is determined and indicated. According to embodiments, this can comprise determining pressure statuses. For example, in addition to determining a pressure level from among thousands of potential pressure levels, statues such as decreasing pressure, increasing pressure, static pressure (no change vis-à-vis a prior pressure level), relatively stable pressure (gradual ramp up or ramp down), and quiescent/no pressure. The determined status and pressure level can be communicated to a touch computing device from an input device. In one example a current pressure level and/or pressure status are communicated using a wireless transceiver in the input device to convey the pressure level information and/or pressure status to a touch application the input device is currently being used to interact with.

In another non-limiting embodiment, a nozzle housing of an input device located near the input device's tip comprises a substantially cylindrical chamber or shaft allowing a plunger to move within it in response to increased and decreased pressure on the input device's tip.

In another embodiment, a stylus input includes a computer readable storage medium having logic encoded thereon, that when executed by a processor, causes the processor to determine and indicate, a number of pressure levels applied to a tip of the input device that is in contact with a surface, such as a touch surface of a touch computing device. In response to determining a pressure level, the logic can include instructions to indicate, via a wireless transceiver other suitable communications means, a pressure level, and a pressure status such as, but not limited to, increasing pressure, decreasing pressure, static pressure, and quiescence (i.e., a lack of pressure on the tip as would be the case when the tip is not in contact with a touch surface).

The logic can be encoded into circuitry such as one or more integrated circuits (ICs) on one or more printed circuit boards (PCBs). For example, the logic can be encoded in an application-specific IC (ASIC). The logic is executable by a processor, such as a microprocessor chip included in the circuitry on a PCB. When executed, the logic determines a pressure level and/or a pressure status.

As used herein, the term "conductive" refers to a property of any object or material that is capable of conducting energy. In embodiments discussed below with reference to FIGS. 3 and 4, a conductive plunger 420, a conductive strip 330, and a resilient disc 452 of a pressure sensor are electrically conductive. For example, the terms "conductive disc", "conductive strip", "conductive film", and "conductive plunger" refer to any such discs, strips, films and plungers comprising materials which permit the flow of electric charges through them. Non-limiting examples of conductive materials include metallic and metal conductors such as, but not limited to, brass, copper, aluminum. Additional exemplary examples of conductive materials include conductive rubber materials.

As used herein, the term "nonconductive" refers to a property of any object or material whose internal electric charges do not flow freely, and which therefore does not conduct an electric current, under the influence of an electric field. In embodiments, a nonconductive material is any material useable as an electrical insulator. For example, a nonconductive material can refer to any a material having a sufficiently high resistivity to be usable as an electrical insulator for voltages produced by electrical components and/or batteries of an external power source and the input device. Non-limiting examples of nonconductive materials include electrical insulators and plastics such as acrylonitrile butadiene styrene (ABS) plastic.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific logic or instructions generated by a compiler and/or an interpreter from code written in any suitable computer-programming language, including, for example, C, C++, C#, Visual Basic, Java, Python, Perl, JavaScript, and ActionScript.

As used herein, the term "input device" refers to any device usable to interact with an interface of a computing device. An input device may be one or more of a keyboard, a microphone, or a pointing/drawing device such as a mouse or stylus. Input devices can be configured to interact with a touch-sensitive interface of a computing device, such as a touch surface or a touch-sensitive display. As used herein, a "stylus" refers to any writing, drawing, or pointing instrument or utensil that is generally configured to be hand held and, in the context of touch screen computing devices, used to interact with a computing device having a touch-sensitive interface or touch surface (i.e., a touch computing device). The terms "input device" and "stylus" are used interchangeably herein to refer broadly and inclusively to any type of input device capable of interacting with a touch computing device.

As used herein, the term "computing device" refers to any computing or other electronic equipment that executes instructions and includes any type of processor-based equipment that operates an operating system or otherwise executes instructions. A computing device will typically include a processor that executes program instructions and may include external or internal components such as a mouse, a CD-ROM, DVD, a keyboard, a display, or other input or output equipment. Examples of computing devices are personal computers, digital assistants, personal digital assistants, mobile phones, smart phones, pagers, tablet computers, laptop computers, Internet appliances, other processor-based devices, gaming devices, and television viewing devices. A computing device can be used as special purpose computing device to provide specific functionality offered by its applications and by the interaction between their applications.

As used herein, the term "application" refers to any program instructions or other functional components that execute on a computing device. An application may reside in the memory of a device that executes the application. As is known to one of skill in the art, such applications may be resident in any suitable computer-readable medium and execute on any suitable processor. For example, as discussed below with reference to FIGS. 3 and 8 the input device 111 can include a computer-readable medium as part of its circuitry 326 and 826. The computer readable medium can be a memory coupled to a processor that executes computer-executable program instructions and/or accesses stored information. Such a processor may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

These illustrative examples are given to introduce the reader to the general subject matter discussed here and are not intended to limit the scope of the disclosed concepts. The following sections describe various additional embodiments and examples with reference to the drawings in which like numerals indicate like elements. For brevity, only the differences occurring within the Figures, as compared to previous or subsequent ones of the figures, are described below.

Exemplary Pressure Sensitive Input Devices

Figure 2:
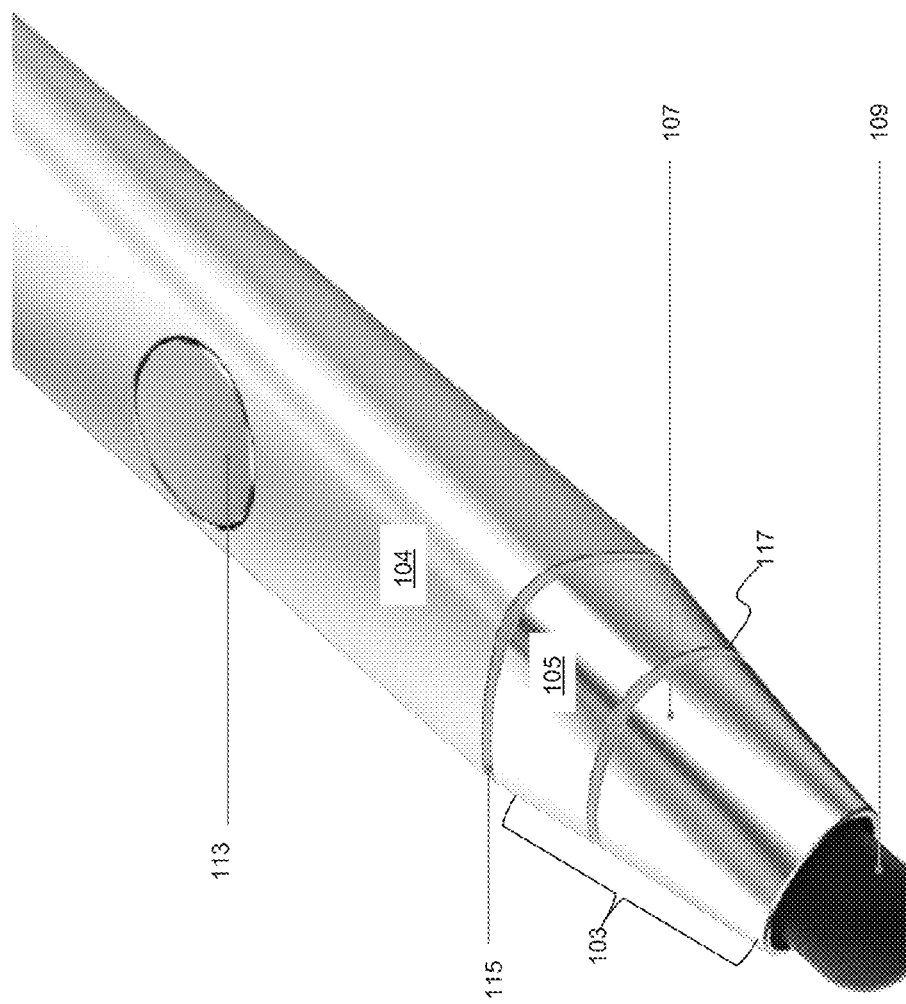
FIG. 2 provides an perspective view of a portion of an input device, according to certain embodiments.

Exemplary input devices having a capacitive tip are described below with reference to FIGS. 1 and 2. FIGS. 1 and 2 include perspective views of a stylus input device configured to interact with a touch computing device. By incorporating the exemplary pressure sensitive tip and pressure sensor described below with reference to FIGS. 3-7, the stylus shown in FIGS. 1 and 2 can be configured to be a pressure sensitive stylus.

FIG. 1 shows a perspective view of a stylus input device 111 with a body 104 having a button 113. The body 104 is encased in a body housing 102 extending from the end of the input device 111 having an indicator light 119 to a nozzle housing 103 at the other end. As shown in FIG. 1, the indicator light can be embodied as a light emitting diode (LED). In the embodiment shown in FIG. 1, the indicator light 119 is located at an end of the body 104 distal from the tip 109 so that it can remain visible to a user while the tip 109 of the input device 111 is in contact with a touch surface of a touch computing device.

In cases where the input device 111 is a stylus with an elongated body like the exemplary body 104, the body housing 102 will be an elongated housing configured to partially or entirely surround internal components of the body 104 and connect to the tip 109 through the nozzle housing 103 of the stylus. The body 104 can be connected to the tip 109 via a nozzle assembly (see, e.g., the nozzle assembly 303 in FIGS. 3 and 6).

In certain embodiments, the input device 111 includes a wireless transceiver in the body 104. For example, an input device 111 embodied as a multifunction stylus may include a Bluetooth® transceiver, a wireless network transceiver, and/or some other wireless transceiver configured to transmit and receive communications, such as, but not limited to, pressure level indications. In embodiments where the body 104 includes a wireless transceiver configured to receive and transmit data communications (i.e., via a Bluetooth or other wireless communications protocol), the indicator light 119 can indicate a communication status for any data communications between the input device 111 and a touch computing device. In embodiments, the indicator light 119 is a multi-stage red, green, and blue (RGB) LED (i.e., a multi-color white LED).

As shown in FIG. 1, the nozzle housing 103 includes a base contact 105 and a tip contact 107. The base and tip contacts 105 and 107 are disposed in different regions or portions of the exterior surface of the nozzle housing 103. Although FIGS. 1 and 2 depict two contacts 105 and 107 on the nozzle housing 103, in alternative embodiments, a conductive region or surface of the nozzle housing 103 may include only a single contact or no contacts. The base and tip contacts 105 and 107 can be electrically insulated from each other by a tip insulator 117. FIG. 1 also shows that the end of the input device 111 distal from the indicator light 119 includes a stylus tip 109 at its extremity. Adjacent to the tip 109 is the tip contact 107 which is separated from the base contact 105 by a tip insulator 117 embodied as a substantially nonconductive ring or disc (i.e., a tip insulating ring). Disposed between the base contact 105 and the body 104 of the input device 111 is a base insulator 115. The base insulator 115 can insulate the base contact 105 from the body housing 102 and body 104 of the input device 111 in cases where either of the body housing 102 or the body 104 is made of a conductive alloy or metal, such as aluminum. In this way, the base insulator 115 disposed between the base contact 105 and the body 104 electrically insulates the base contact 105 from the stylus body 104 and other stylus components, such as the button 113. Each of the base and tip insulators 115 and 117 may be comprised of a substantially nonconductive material, such as plastic. In the embodiment shown in FIG. 1, a nonconductive base insulator 115 is disposed between the base contact 105 and the body 104 to electrically insulate the base contact 105 from the stylus body 104 and other stylus components. This may be employed to electrically insulate base contact 105 from the body 104 in cases where the body 104 is made of a conductive alloy or metal. Non-limiting examples of arrangements and configurations of such contacts and insulators for a stylus are described in commonly-assigned U.S. patent application Ser. No. 13/856,070, entitled "Charging Mechanism Through a Conductive Stylus Nozzle," by Dowd et al., which is incorporated by reference herein in its entirety.

If the input device 111 is a pressure sensitive stylus, the tip 109 will be a pressure sensitive tip. Such a pressure sensitive tip 109 may be manufactured from a smooth and/or gentle material that is not harmful to a touch screen of a touch computing device. As discussed below with reference to FIGS. 3-7, the pressure sensitive tip 109 can also be manufactured from a material that deforms when force is applied thereto. For example, the tip 109 may be manufactured from a synthetic or natural rubber material. Additionally, included within the input device 111 may be a memory, a wireless transceiver, a processing unit, and/or other components (see, e.g., battery 808 and main circuitry 826 in FIG. 8). These components within a stylus input device 111 may be distributed evenly such that the weight distribution of the stylus is balanced. The tip 109 and other components of such a stylus may be selected to provide capacitive capabilities for interacting with certain touch computing devices in addition to transferring some amount of pressure to internal pressure sensing components within the input device 111. For example, in one embodiment, the tip 109 can comprise a material having an American Society for Testing and Materials (ASTM) technical standard D2240 Durometer Type A scale value of about 40 (i.e., a Durometer value of about Shore A 40). Non-limiting examples of such materials are synthetic rubber (i.e., a silicone rubber) and natural rubber.

FIG. 2 provides a magnified exterior perspective view of portions of an input device. FIG. 1 is described with continued reference to the embodiment illustrated in FIG. 1. However, FIG. 2 is not limited to that embodiment. FIG. 2 illustrates an exterior portion of a stylus input device having a physical button 113 that is slightly concave with respect to the body housing 102. The body housing 102 can comprise a metallic surface in the example provided in FIG. 2. As shown in FIG. 2, the nozzle housing 103 and its base and tip contacts 105 and 107, and the tip 109 are located at an end of the stylus near the button 113. FIG. 2 provides an enlarged, exterior view of portions of the stylus and illustrates how, in embodiments, the body 104, the button 113, and the nozzle housing 103 can each comprise visually distinguishable surfaces. FIG. 2 shows an exemplary arrangement of the base and tip contacts 105 and 107 and the base and tip insulators 115 and 117 on an exterior surface of the nozzle housing 103. As shown in FIG. 2, the tip 109 protrudes from the nozzle housing 103, which is coupled to the body 104 near the base insulator 115. As shown in the non-limiting example of FIG. 2, the nozzle housing 103 can be tapered, substantially conical portion of the stylus input device 111 near the stylus tip 109.

Exemplary Pressure Sensors

FIGS. 3-7 provide various perspective and cross-sectional views of exemplary pressure sensors and their components. FIGS. 3-7 are described with continued reference to the embodiments illustrated in FIGS. 1 and 2. However, FIGS. 3-7 are not limited to those embodiments.

Figure 3:
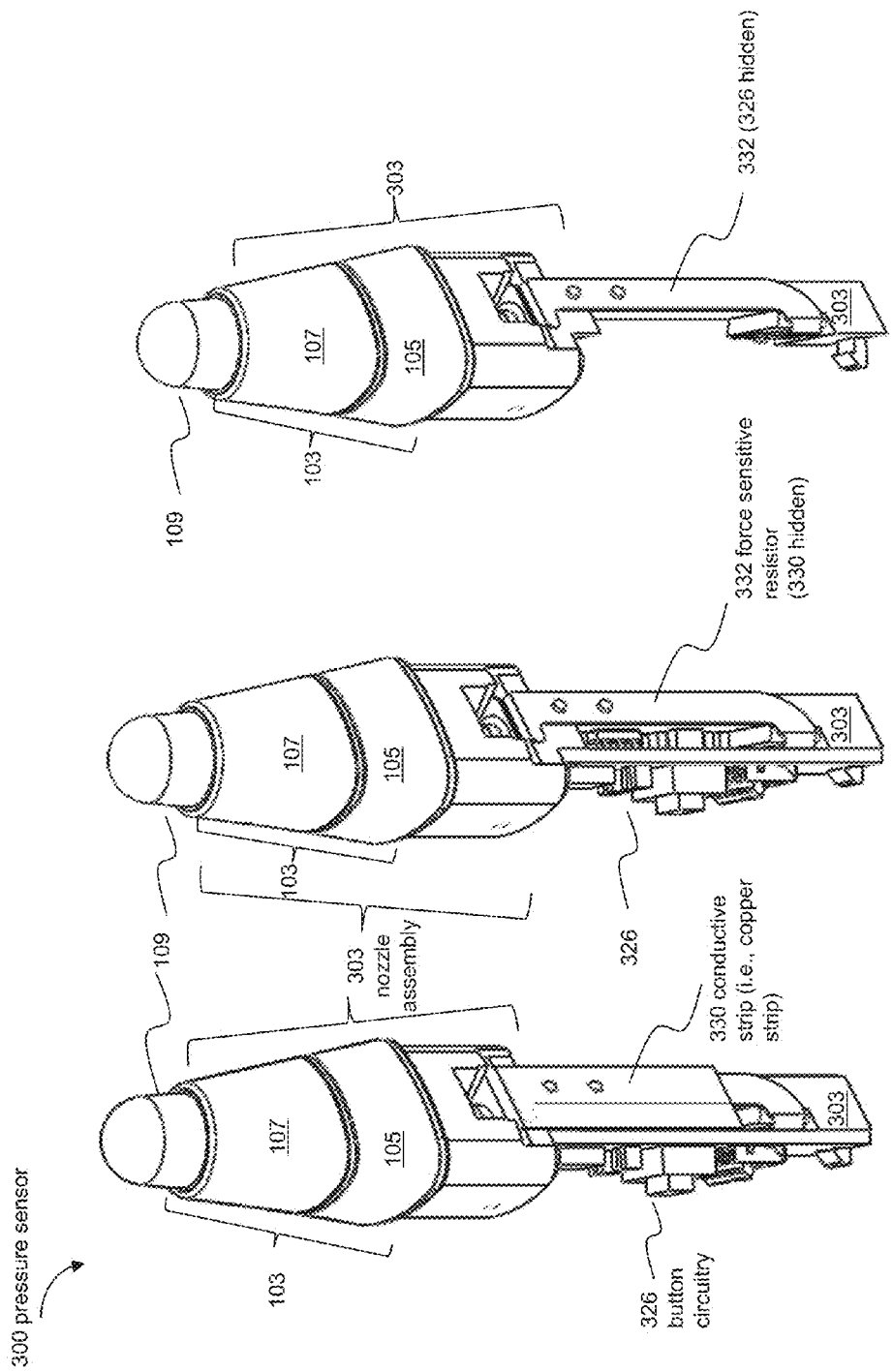
FIGS. 3-5 provide perspective and cross-sectional views of a pressure sensor, according to certain embodiments.

As shown in FIG. 3, a pressure sensor 300 can be incorporated into the nozzle housing 103 of an input device near the tip 109. The nozzle housing 103 can form part of a nozzle assembly 303 that houses components of the pressure sensor 300. The pressure sensor 300 can comprise a conductive strip 330 and a force sensitive resistor 332. In the example of FIG. 3, the conductive strip 330 is a copper strip extending along a lengthwise side of the nozzle assembly 303. Functionality and features of the force sensitive resistor 332 are discussed below with reference to FIGS. 4-7.

With continued reference to FIG. 3, in an embodiment, the portion of the nozzle assembly 303 below the base contact 105 (i.e., distal from the tip 109) can be encased in the body housing 102 shown in FIG. 1. FIG. 3 also shows that the nozzle assembly 303 can include button circuitry 326, so-called due to its proximity to the button 113 of FIGS. 1 and 2 when the nozzle assembly 303 is coupled to the body 104. With reference to FIGS. 1 and 3, in an embodiment, the nozzle assembly 303 can be partially inserted into an opening in an end of the body 104 distal from the indicator light 119 to form the stylus input device 111.

In instances where the input device 111 is a pressure sensitive stylus, the tip 109 can comprise a hollow rubber portion (see, e.g., tip 109 and tip cavity 409 in FIG. 4) and be configured as a pressure sensitive tip coupled to pressure sensing components within the nozzle housing 103. These pressure-sensing components are adapted to convey varying levels of mechanical pressure from the tip 109 to a pressure sensor within the stylus. The stylus body and the nozzle housing 103 may include electromechanical components and pressure sensors as part of button circuitry 326 that enable the tip 109 to sense or detect many levels of pressure.

In an embodiment, the conductive strip 330 is a copper strip or tape that acts as an electrical bridge, going down length of the body 104 and conducts electrically to the rubber tip 109. Such conductivity may be needed to ground a user holding the input device 111 in cases where the body housing 102 of the input device 111 comprises a conductive material and the touch surface is capacitive.

FIG. 4 provides perspective and side cross-sectional views of the pressure sensor 300 and the force sensitive resistor 332. As shown in FIG. 4, the pressure sensor 300 further comprises a plunger 420 that can move within a chamber 422 that is formed within the nozzle housing 103. For example, as discussed below, the plunger 420 can move in the direction marked by the arrow 421 within the chamber 422.

According to one exemplary embodiment, a pressure sensitive input device includes a pressure sensor 300 configured to sense force or pressure applied to a rubber tip 109 at an end of the input device 111. The tip 109 has a tip cavity 409 (i.e., is hollow) and comprises material configured to compress via deformation (i.e., a natural or synthetic rubber such as, but not limited to, silicone) when pressure is applied to an exterior surface of the tip 109.

FIGS. 4 and 5 show how the tip 109, the plunger 420 (which is connected to fastener/nut 440 in the examples of FIGS. 4 and 5), the conductive strip 330, the force sensitive resistor 332, and the disc 452 (collectively, the pressure sensor 300), can detect and measure levels of pressure corresponding to changes in mechanical forces applied at the tip 109, as explained below.

Figure 6:
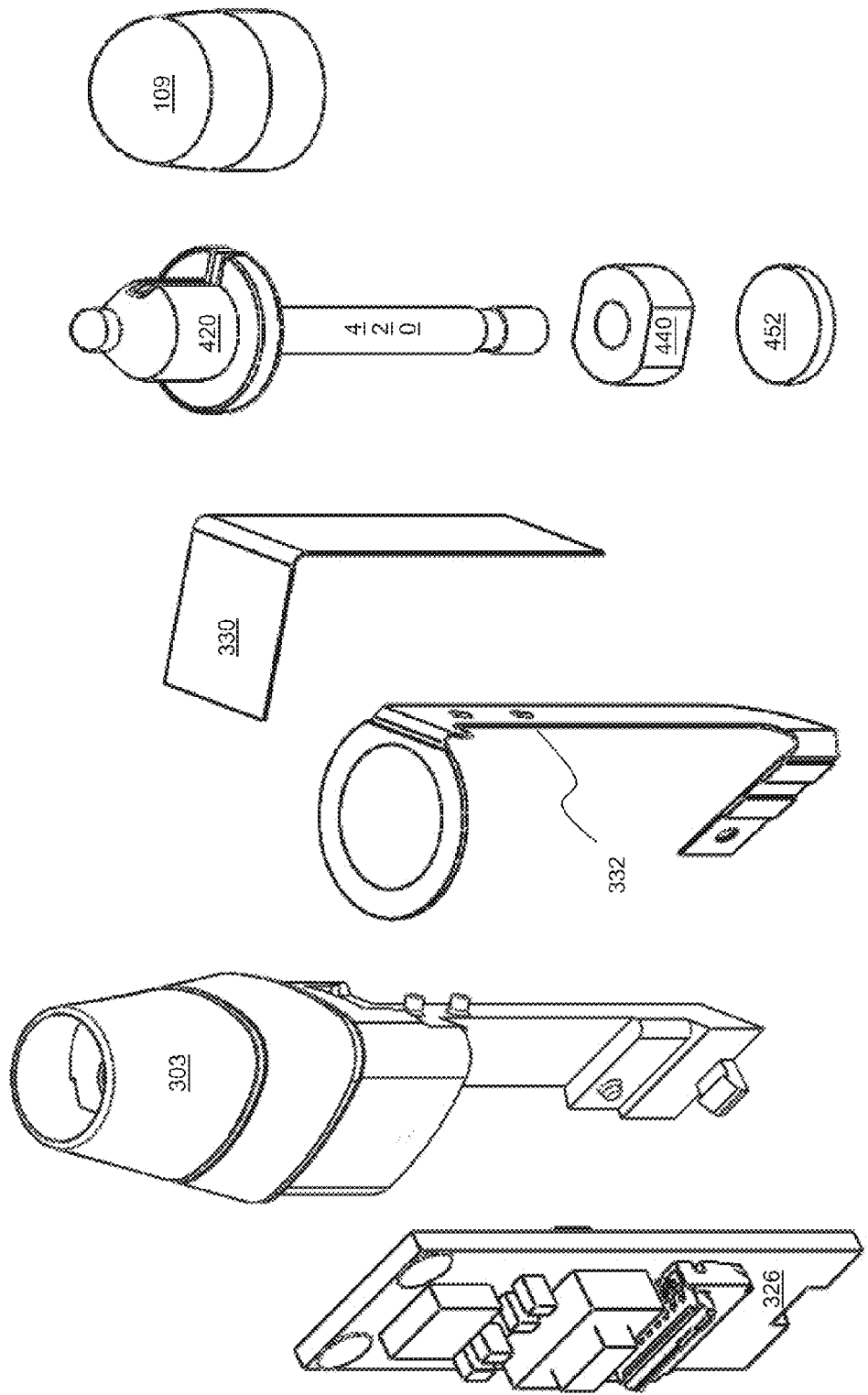
FIG. 6 provides perspective views of components of pressure sensor, according to certain embodiments.

In the examples of FIGS. 4 and 5, the chamber 422 is a substantially cylindrical chamber so as to allow movement of a cylindrical portion of the plunger 420 within the chamber such as the exemplary plunger shown in FIGS. 5 and 6. For example, the chamber 422 may be substantially cylindrical to allow the movement in the directions 421 and 521 within the portion of the plunger 420 between where it is coupled to the tip 109 and the fastener 440. In alternative embodiments, the chamber 422 can have any shape that allows substantially free movement of the plunger 420. That is, the shape, length, width, and diameter of the chamber 422 are selected in order to accommodate the portion of the plunger 420 that moves within the chamber 422.

With reference to FIG. 4, when a force, marked by the arrow, F, is applied to the tip 109, it can cause the tip 109 to deform, which in turn can bring a wall of the tip cavity 409 into physical contact with the plunger 420. In non-limiting embodiments, the tip 109 has a thickness in the range of about 0.3-0.4 millimeters (mm) between an exterior surface of the tip 109 and an interior wall of the tip cavity 409. As shown in FIG. 4, the force F can be a partially tangential force applied to the tip 109 with respect to the vertical orientation of the plunger 420 in the example of FIG. 4. In addition, levels of forces applied in other directions (not shown) to the tip 109 can be quantified in a similar manner as discussed below with regard to the force F.

With continued reference to FIG. 4, the pressure sensor 300 also comprises a tip 109 having a tip cavity 409 adapted to accommodate an end of the plunger 420 that is coupled to the plunger 420. As shown, the end of plunger 420 can be positioned within the tip cavity 409 such that in a quiescent state (i.e., when no force F is applied); the end of the plunger in the tip cavity 409 is not physically touching a wall of the tip cavity 409. In this quiescent state, the plunger 420 and its connected fastener 440 may apply a minimal preload to the force sensitive resistor 332 if the plunger 420 (with or without the fastener 440) has the effect of applying a static force (a bias force) to the force sensitive resistor 332, however small the preload might be. For example, a disc 452 of resilient conductive material positioned between the fastener 440 and the force sensitive resistor 332 might preload the force sensitive resistor 332 if the material comprising the disc 452 (i.e., conductive rubber in the example of FIG. 4) expands after insertion into a pressure sensor. Pressure sensors, such as pressure sensor 300, that have a minimal, negligible preload on their pressure sensing element while also effectively transferring many levels of pressure corresponding to varying applied forces so as to enable precise determinations of force levels are more suitable for pressure sensors for touch input devices such as pressure sensitive styli input devices.

As shown in FIG. 4, application of the force F causes the plunger 420 to move in a direction indicated by arrow 421, which causes the plunger 420 and/or its attached fastener 440 to transfer at least a portion of the force F to the disc 452. In this way, the pressure sensor 300 can measure level of pressure corresponding to the force F via transmission of the force F from the tip 109 along the plunger 420 moving in the direction 421, thus causing the disc 452 to deform (i.e., compress and/or spread out). The deformation of the disc 452 applies a level of pressure to the force sensitive resistor 332. As shown in the example of FIG. 4, the disc 452 applies pressure to the force sensitive resistor 332 indirectly via deformation that pushes the relatively thin strip 330, which lies between the disc 452 and the force sensitive resistor 332, into the force sensitive resistor 332.

In embodiments, levels or amounts of pressure are measured by a stylus having the tip 109 and the pressure sensor 300 shown in FIG. 4 as described below.

By deforming in response to application of a force F being applied to it, the tip 109 transfers at least a portion of the force F to the force sensitive resistor 332 of the pressure sensor 300. This is achieved when the deformation of the tip 109 moves the plunger 420 in the direction 421 as a result of wall of the tip cavity 409 being pressed into physical contact with the end of the plunger 420 proximate to the tip 109. A force such as the force F can be applied to the tip 109 due to the tip 109 being pressed onto a capacitive touch surface. Movement of the plunger 420 in the direction 421 compresses the disc 452, which is electrically connected, via the conductive strip 330, to the force sensitive resistor 332. The force sensitive resistor 332 is configured to respond to an increase in force resulting from at least part of the force F being transferred by the plunger 420 and being applied to the force sensitive resistor 332 by compression of the disc 452. In an embodiment, the force sensitive resistor 332 responds to such an increase in pressure resulting from the application of force F by exhibiting a decrease in resistance. That is, when the disc 452 compresses, it causes the adjacent, relatively thin conductive strip 330 to press (i.e., apply pressure) on a surface of the force sensitive resistor 332, which then exhibits increased conductivity (i.e., decreased resistance). The level of pressure corresponding to this increased pressure applied to the tip 109 can be measured in terms of the decreased resistance exhibited by the force sensitive resistor 332 (i.e., in ohms or mega ohms/Mohms). In other words, output voltage of a circuit of the pressure sensor 300 including the force sensitive resistor 332 increases when the force F is applied to the tip 109 and then transferred to the force sensitive resistor 332 via the plunger 420-disc 452 mechanism. Conversely, output voltage of the pressure sensor's 300 circuit including the force sensitive resistor 332 decreases as force is decreased as a result of the decreasing force on the tip 109 (i.e., as the tip 109 is lifted away from the touch surface to eliminate the force F), thus causing the disc 452 to expand and push the plunger away from the force sensitive resistor. In this way, the force sensitive resistor acts as a measuring resistor for changes in pressure levels.

The pressure sensor 300 is configured to measure both increases and decreases in pressure levels as described below.

For example, the force sensitive resistor 332 exhibits decreasing levels of electrical resistance (i.e., decreased resistance measured in terms of ohms) as increasing levels of force are applied to the stylus tip. According to embodiments, an increase in applied force occurs when the force F applied to the stylus tip 109 (i.e., resulting from the tip 109 being pressed onto a touch screen) causes deformation of the tip 109, which in turn moves the plunger 420 towards the disc 452, thus compressing the disc 452. Compression of the disc 452 transfers at least a portion of the force F to the force sensitive resistor 332. As shown in FIGS. 4, 5 and 7, the force sensitive resistor 332 is in close proximity to, and electrically connected to the disc 452. In the embodiments shown in FIGS. 4, 5, and 7, conductive strip 330 is relatively thin as compared to the disc 452 and is disposed as a sheet or metallic film between the disc 452 and the force sensitive resistor 332. The conductive strip 330 is sufficiently thin and pliable so as to allow transfer of at least a portion of the force F from the compressed disc 452. The force sensitive resistor 332 reacts to this transferred portion of the force F, which represents an increase in an applied force, by exhibiting increased conductivity (e.g., decreased resistance).

With reference to FIG. 5, the force sensitive resistor 332 provides a different response (i.e., increased resistance) when decreasing levels of force are applied to the stylus tip 109. For example, if the tip 109 is lifted from a touch surface after having been previously pressed into the surface, the compressed disc 452 will expand and decompress in an attempt to return to its shape prior to application of the previous force F shown in FIG. 4. Due to resilient properties of the disc 452 and elastic properties of the tip 109, expansion of the disc 452 will push the plunger 420 along the chamber 422 towards the tip 109 in the direction indicated by arrow 521. At this point the tip 109 which will return to its pre-deformation shape. As the plunger 420 moves away from the disc 452 in the direction 521, towards the tip 109, the conductive strip 330 releases the pressure previously applied to the force sensitive resistor 332. This results in decreased force being applied to the force sensitive resistor 332 as compared to the previously applied level of force F depicted in FIG. 4. The force sensitive resistor 332 reacts to this decreased force level by exhibiting decreased conductivity (e.g., increased resistance).

In some embodiments, the fastener 440 need not be attached to the plunger 420. For example the end of the plunger 420 adjacent to the disc 452 can include a flange or integrated plate that serves the purpose of the fastener 440, namely, to provide a larger interface/contact area with the disc 452 than otherwise provided by the relatively narrow end of the plunger 420 that is in proximate to the disc 452 as shown in FIGS. 4 and 5. FIG. 5 shows a force sensing assembly 500 without the nozzle housing 103 and the housing assembly 303. As shown, the fastener 440 can be substantially the same diameter or width as the disc 452. The assembly 500 also depicts the relative thinness of the conductive strip 330 vis-à-vis the force sensitive resistor 332. This thinness, in combination with selection of pliable, conductive materials, such as, but not limited to, copper, allow the conductive strip 330 to transfer at least a portion of the force F applied to the tip 109 through to the force sensitive resistor 332 via transmission of the at least the portion of the force F along the movement of the plunger 420 in the direction 421 towards the disc 452. This movement causes the plunger 420 and/or its attached fastener 440, to push into the disc 452, which then compresses. This compression is applied as the at least a portion of the force F to force sensitive resistor 332 when the conductive strip 330 presses into the adjacent force sensitive resistor 332.

FIG. 6 provides perspective views of the components of the pressure sensor 300 together with the button circuitry 326. In embodiments, the disc 452 is a cylindrical, puck-shaped disc comprising conductive or capacitive resilient materials, such as, but not limited to, capacitive rubber and electrically conductive rubbers. The conductive rubber can be embodied as any elastomer that is electrically conductive and has sufficient resiliency to be used in the pressure sensor 300. The disc 452 is comprised of a conductive or capacitive resilient material, such as conductive rubber. The resiliency of the disc 452 gives it the ability to absorb energy corresponding to a force (i.e., force F in FIG. 4) when it is deformed elastically (i.e., compressed and/or spread out over a portion of the conductive strip 330 layered between the disc 452 and the force sensitive resistor 332). The resilient material used for the disc 452 also allows the disc 452 to subsequently release that energy upon unloading. In the context of the pressure sensor 300, the unloading is embodied as the disc 452 'springing back' or expanding back to its uncompressed, non-deformed shape after the force F is no longer being applied to the tip 109. This expansion of the disc 452 substantially returns it to its shape and dimension prior to being compressed. The expansion causes the conductive strip 330 to release the previously applied pressure from the force sensitive resistor 332. One indication of resiliency for materials, such as materials included in the disc 452, is elasticity. Elasticity of the disc 452 can be a measure of the stiffness of the conductive or capacitive materials comprising the disc 452. In embodiments, the disc 452 exhibits a sufficient stiffness, elasticity, and/or resiliency to unload the energy of a previously-applied force F after the force F is no longer being applied by decompressing back to its pre-force shape. This decompression pushes the plunger 420 back, in a direction opposite to direction 421, by substantially the same amount that the plunger 420 moved when the force F was originally applied to the tip 109.

According to embodiments, the tip 109 is a capacitive tip for interacting with capacitive touch surface and the tip 109. In certain embodiments where the body housing 102 and/or the button 113 comprises a conductive material, such a capacitive tip 109 may need to be capacitively connected to a user of the stylus 111 so as to ground the user while the tip 109 is in contact with a capacitive touch surface. In an embodiment, this capacitive connection is routed through the disc 452 that pushes on the force sensitive resistor 332. In one non-limiting embodiment, the disc 452 comprises a conductive rubber material. According to embodiments, the disc 452 is configured to do at least two things when a force is applied to it, namely, (1) spread out an applied force over a surface of the force sensitive resistor 332 so as to more evenly distribute the force, thereby allowing more accurate pressure level readings; and (2) transfer the applied force more effectively than a 'hard on hard' interface. Examples of such hard on hard interfaces that may exist in the absence of the disc 452 are direct interfaces between the plunger 420 and the force sensitive resistor 332 and/or the fastener 440 and the force sensitive resistor 332, as would be the case if the plunger 420 and/or the fastener 440 were arranged to be in direct contact with the force sensitive resistor 332.

In the embodiments shown in FIGS. 4-6, the conductive strip 330 is a relatively thin film or sheet arranged between the force sensitive resistor 332 and the disc 452, and the disc 452 is a relatively thicker, resilient layer of conductive material arranged between the conductive strip 330 and the plunger 420 (and/or its attached fastener 440 in embodiments of the pressure sensor 300 including the fastener 440).

In embodiments, the fastener 440 is a nut arranged in the portion of the chamber 422 proximate to the base 104 during assembly of the input device 111 so that the plunger 420 can be slid into the chamber 422 within the nozzle housing 103 and attached to the fastener 440. In alternative embodiments, the fastener 440 need not be included. For example, the plunger 420 can be configured to have a diameter or width at the end of the plunger 420 that is proximate to the disc 452, wherein the diameter or width is sufficient to transfer an applied force to the disc 452. In these embodiments, the width or diameter of the plunger 420 and another end of the plunger 420 connected to the tip 109 is sufficiently narrow to allow the tip 109 to protrude from an opening in a tapered or conical nozzle housing, such as, for example, the nozzle housing 103 of the exemplary stylus input devices shown in FIGS. 1 and 2. In alternative embodiments, the fastener 440 is not a separate component, but is an integral portion of the plunger 420. For example, the plunger 420 can be configured to have a flange at the end of the plunger 420 that is proximate to the disc 452, wherein the flange has a sufficient width or diameter to transfer an applied force to the disc 452. In these embodiments, the fastener 440 need not be screwed or otherwise attached to the plunger 420 as a separate component.

In certain embodiments, the plunger 420 can comprise a metal or alloy such as, but not limited to, brass. In additional or alternative embodiments, the strip 330 can comprise an alloy or metal such as, but not limited to, copper. In additional or alternative embodiments, disc 452 can comprise a conductive rubber material.

Exemplary Nozzle Components

FIG. 7 provides cross-sectional perspective views of exemplary arrangements of components included in the nozzle housing 103. FIG. 7 is described with continued reference to the embodiments illustrated in FIGS. 1-6. However, FIG. 7 is not limited to those embodiments.

In FIG. 7, cross sectional views of the nozzle housing 103 show that portions of the base and tip insulators 115 and 117 inside the nozzle housing 103 can form the chamber 422 which partially surrounds the plunger 420 and allows the plunger to slide or move within it in response to pressure increasing or decreasing at the tip 109. In certain embodiments, the plunger 420, together with the additional mechanical and electromechanical components described above with regard to FIGS. 1-6, functions as a component of the pressure sensor 300. FIG. 7 shows that the plunger 420 is coupled the tip 109. FIG. 7 also shows that in a quiescent state (i.e., the absence of pressure on the tip 109), an end of the plunger 420 is positioned within the tip cavity 409 such that the end of the plunger proximate to the tip 109 is not in physical contact with the tip 109. In embodiments, the plunger 420 conveys or transfers pressure applied to the tip 109 to a pressure sensor 300. FIG. 7 shows how the tip 109, the plunger 420 (which is connected to fastener 440/nut in the example of FIG. 7), the conductive strip 330, the force sensitive resistor 332, and the disc 452 (collectively, the pressure sensor 300), can detect and measure a level of pressure corresponding to a force marked by the arrow, F, as explained below.

As shown in FIG. 7, the plunger 420 can move within the chamber 422 in the direction indicated by arrow 721 when a force (F) is applied to the tip 109. By deforming in response to application of a force F being applied to it, the tip 109 transfers at least a portion of the force F to the force sensitive resistor 332 of the pressure sensor 300. This is achieved when the deformation of the tip 109 moves the plunger 420 in the direction 721 as a result of wall of the tip cavity 409 being pressed into physical contact with the end of the plunger 420 proximate to the tip 109. A force such as the force F can be applied to the tip 109 due to the tip 109 being pressed onto a touch screen of a touch computing device. Movement of the plunger 420 in the direction 721 compresses the disc 452, which is electrically connected, via the conductive strip 330, to the force sensitive resistor 332. This movement 721 results in the conductive strip 330 pressing on the force sensitive resistor 332. The force sensitive resistor 332 can respond to an increase in force resulting from at least part of the force F being transferred by the plunger 420 and being applied to the force sensitive resistor 332 by compression of the disc 452. In an embodiment, the force sensitive resistor 332 responds to such an increase in pressure resulting from the application of force F by exhibiting an increase in conductance. That is, when the disc 452 compresses, it causes the adjacent, relatively thin conductive strip 330 to press on a surface of the force sensitive resistor 332, which then exhibits decreased resistance. The level of pressure corresponding to this increased pressure applied to the tip 109 can be measured in terms of the decreased resistance exhibited by the force sensitive resistor 332. In other words, output voltage of a circuit of the pressure sensor 300 including the force sensitive resistor 332 increases when the force F is applied to the tip 109 and then transferred to the force sensitive resistor 332 via the plunger 420-disc 452

With reference to FIGS. 3 and 6, the pressure sensor 300 can be located on or near the button circuitry 326. The plunger 420 may comprise a conductive metal, such as brass. As shown in FIG. 7, the base and tip insulators 115 and 117 serve to prevent unwanted electrical contacts, arcs, and short circuits (i.e., shorts) between the plunger 420 and the contacts 105 and 107. The chamber 422 allows substantially free movement of the plunger 420 in directions that are substantially parallel with respect to a plane aligned with a lengthwise orientation of the body 104 of the input device 111. Alternatively, or in addition, the chamber 422 allows the plunger 420 to move in directions that are substantially perpendicular to or tangential to a plane corresponding to a touch surface or touch screen of a touch computing device that the input device 111 is being used to interact with. For example, when the input device's 111 tip 109 is in contact with a touch surface, the chamber 422 allows the plunger 420 to move up and down in directions that are tangential to and/or substantially perpendicular or orthogonal to the touch computing device's touch surface. Interior surfaces of the chamber 422 may comprise nonconductive materials so as to isolate electrical contacts, such as, for example contacts 105 and 107, used for charging the input device 111 from the tip 109, the plunger 420, the fastener 440, and/or other components used in sensing pressure.

As shown in FIG. 7, the portions of the base insulator 115 within the nozzle housing 103 can form part of a substantially cylindrical duct that is part of the chamber 422 and is adapted to allow substantially free movement of the plunger 420 between the tip 109 and a side of the chamber 422 distal from the tip 109. In embodiments where the plunger 420 is not cylindrical, the chamber 422 is shaped so as to allow substantially free movement of whatever shape the coupling member and/or plunger 420 has.

Exemplary Circuitry Implementations

Figure 8:
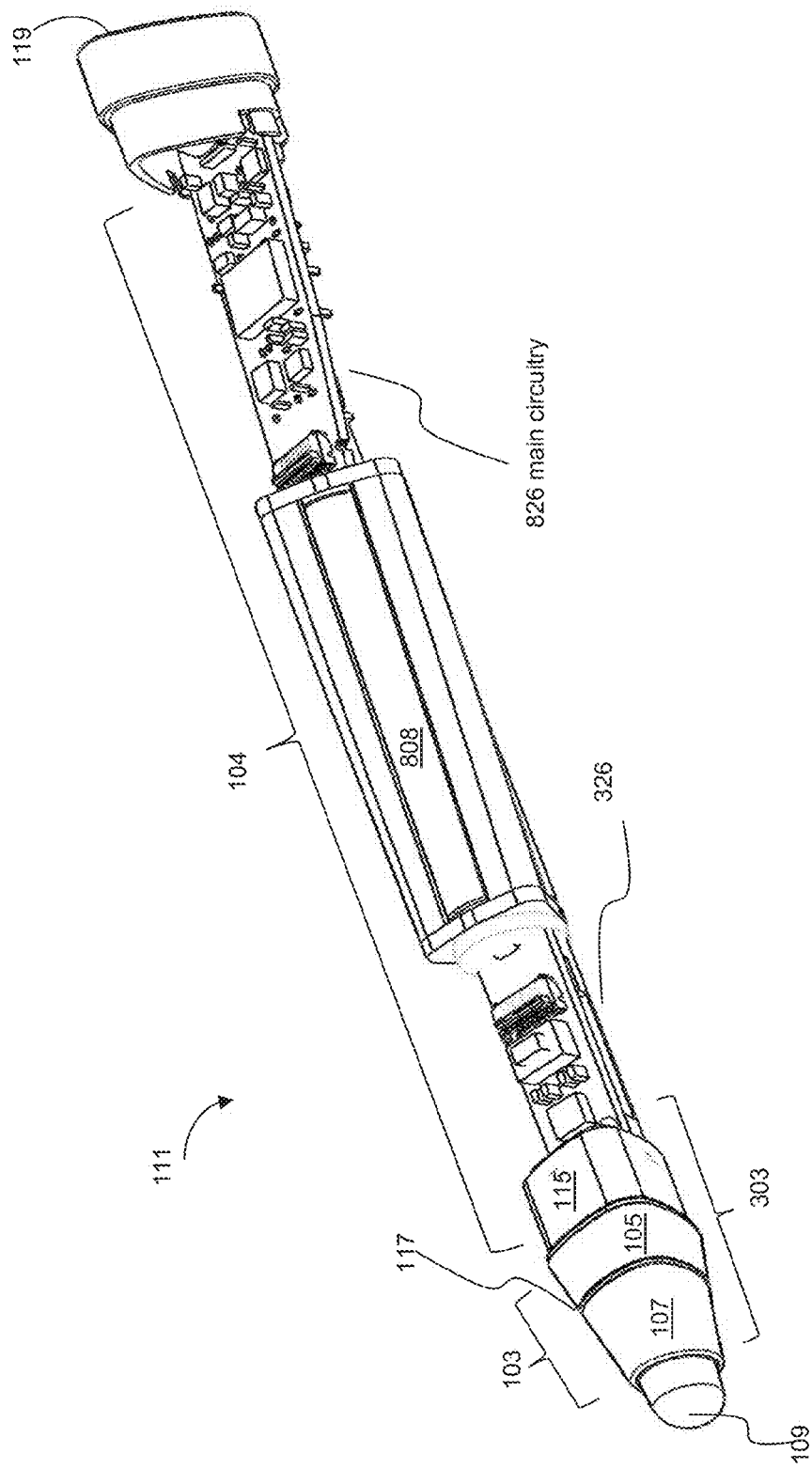
FIG. 8 provides a perspective interior of the input device illustrated in FIG. 1.

FIG. 8 provides a perspective interior of the input device 111. FIG. 8 is described with continued reference to the embodiments illustrated in FIGS. 1-7. However, FIG. 8 is not limited to those embodiments. In particular, FIG. 8 depicts the body 104 with the body housing 102 removed. FIG. 8 shows that the input device 111 includes the button circuitry 326 between the base insulator 115 and an internal battery 808. The input device 111 can also include main circuitry 826 between the internal battery 808 and the indicator light 119. In certain embodiments, only one circuit board may be used to implement the functionality of the button circuitry 326 and the main circuitry 826.

Among other functionality, the button circuitry 326 is configured to provide the force levels measured by the pressure sensor 300. The button circuitry 326 may communicate or otherwise indicate measured levels of pressure via a wireless transceiver of the input device 111. Alternatively, the button circuitry 326 can relay measured force levels via the main circuitry 826, which in turn can communicate or convey the pressure levels measured by the pressure sensor 300.

According to embodiments, the pressure sensor 300 includes electronics and logic to indicate changes in pressure levels on the tip 109 to a touch application executing on a touch computing device. In additional or alternative embodiments, the button circuitry 326 and/or the main circuitry 826 includes electronics and logic to indicate changes in pressure levels on the tip 109 to a touch application executing on a touch computing device. The indications can be communicated on a substantially real time basis. In one embodiment, logic is implemented as an integrated circuit (IC) within the button circuitry 326. Changes in pressure applied to the tip 109 and transferred to the force sensitive resistor 332 via the plunger 420 and the disc 452 are measured and quantified. In certain embodiments, the measuring and quantification can be performed by the circuitry, such as, for example, the button circuitry 326, which in turn are communicated to the touch computing device the input device 111 is currently interacting with.

In accordance with embodiments, the button circuitry 326 and the main circuitry 826 include a computer readable storage medium with executable instructions or logic for indicating pressure levels detected for the stylus tip 109. The circuitry 326, 826 can comprise a printed circuit board (PCB) having one or more ICs or ASICs with logic encoded on them. The logic is executable by a processor, such as a microprocessor chip included in the circuitry 326, 826 as part of the PCB. When executed, the logic determines a status, such as increasing pressure, decreasing pressure, and quiescence (i.e., a lack of mechanical force on the tip 109). The circuitry 326, 826 then indicates the determined status and/or a current level of pressure in near real time to a touch application to which the stylus 111 is currently providing input.

Like a pairing operation between a stylus input device 111 and a touch computing device, in embodiments, indications of pressure levels and a pressure status are performed wirelessly.

According to embodiments, the battery 808 supplies power to electrical components of the input device 111, including the button circuitry 326, the pressure sensor 300, the indicator light 119, and the main circuitry 826.

Additionally, and as needed by a touch application, the circuitry 326 and/or 826, in conjunction with the pressure sensor 300 can provide a current pressure level, pressure status (e.g., increasing, decreasing, stable/static, quiescence) along with historical pressure level data. Such data and information can be communicated via a wireless transceiver of the input device 111. For example, an input device 111 embodied as a multifunction stylus may include a wireless transceiver, such as a Bluetooth® transceiver, a wireless network transceiver, and/or some other wireless transceiver for such communications.

Exemplary Pressure Sensing Method

Figure 9:
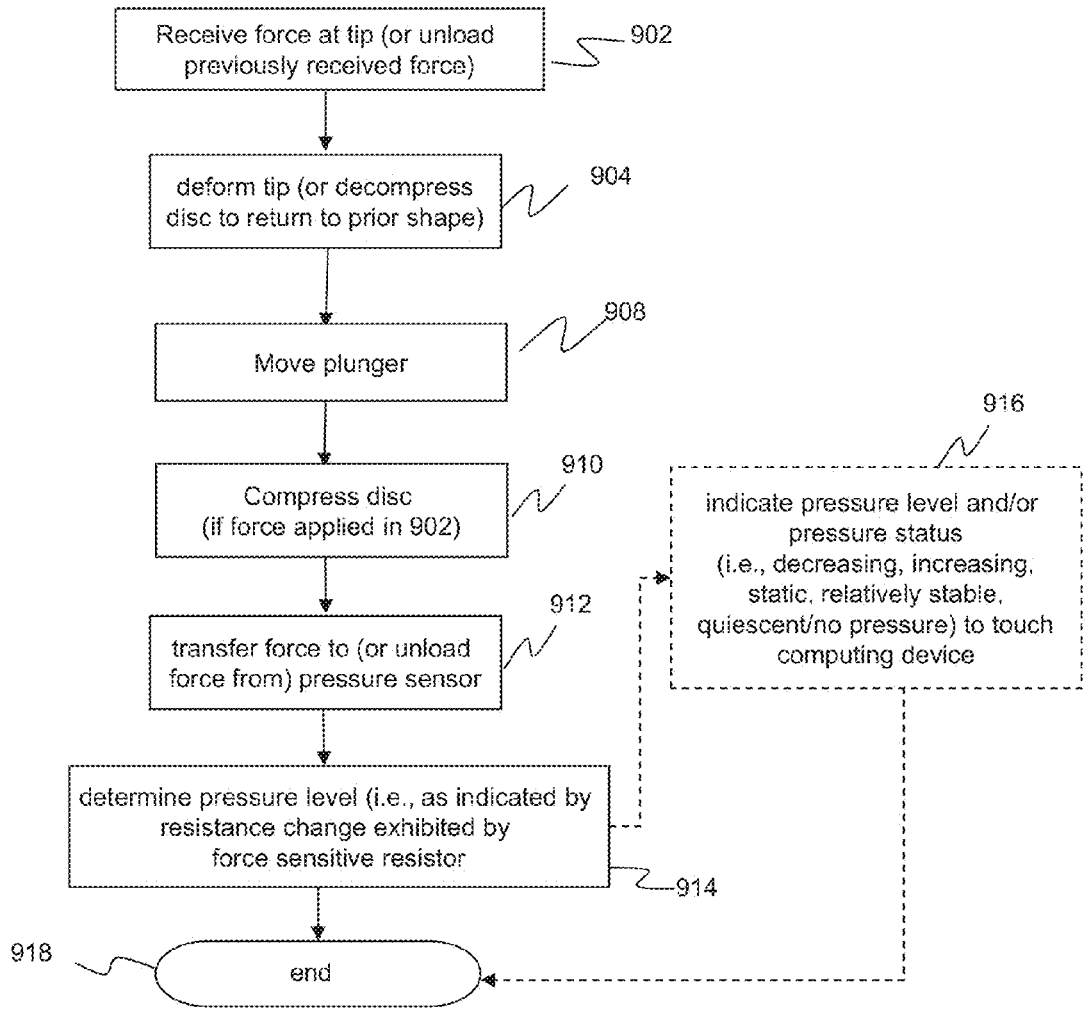
FIG. 9 is a flowchart illustrating an exemplary method for sensing pressure using a pressure sensor mechanism.

FIG. 9 is a flowchart that provides one example of a method determining levels of pressure for input devices described herein. FIG. 9 is described with continued reference to the embodiments illustrated in FIGS. 1-8. However, FIG. 9 is not limited to those embodiments. It is understood that the flowchart of FIG. 9 provides merely an example of a method to implement the pressure sensing operations of the input devices described herein. As an alternative, the flowchart of FIG. 9 may be viewed as depicting an example of steps of a method implemented by the logic and circuitry of the input device described herein according to one or more embodiments. For illustrative purposes, the method 900 is described with reference to the input device 111 and pressure sensor 300 implementations depicted in FIGS. 1-8. Other implementations, however, are possible. For example, instead of determining levels of pressure using the exemplary pressure sensor 300 shown in FIGS. 3, 4, and 5, the method 900 can be performed using other suitable pressure sensors capable of transferring at least a portion of an applied force from a tip to a force sensitive resistor 332. For example, the method 900 may be carried out with a force sensor without the fastener 440. The steps the pressure sensing method 900 do not necessarily have to occur in the order shown in FIG. 9 and described below. For example, in embodiments, step 916 can be performed prior to step 914, in parallel with step 914, and/or after step 914 as shown in FIG. 9. According to embodiments, some of the steps shown in FIG. 9 are optional. Optional steps are indicated in the flowchart by dashed lines (see, e.g., 916).

Beginning with step 902, an input device receives a mechanical force at its tip 109. According to an exemplary embodiment, the input device 111 is configured to detect changes in pressure using the pressure sensor 300 depicted in FIGS. 3, 4 and 6.

Next, in step 904, the tip deforms in response to the force received in step 902. As show in FIG. 9, in cases where a previously received force is being releases (i.e., when the tip 109 is lifted from a touch surface), step 904 comprises decompressing or expanding the disc 452.

Next, in step 908, the plunger 420 is moved. As shown in FIG. 9, this step comprises moving the plunger away from tip if a force was received in step 902. Otherwise, step 908 comprises moving the plunger 420 towards the tip 109 (i.e., if a previously received force is being released or unloaded). After the plunger 420 is moved, control is passed to step 910.

In step 910, the disc 452 is compressed if the plunger was moved away from the tip in step 908. Otherwise, step 910 comprises expanding the disc 452 if the plunger was moved towards the tip in step 908.

In step 912, the force is transferred (or unloaded from) the force sensitive resistor 332. Step 912 can comprise applying the force by pressing the conductive strip 330 into the force sensitive resistor 332 if a force was received in step 902. This step can alternatively comprise releasing a previously applied force by flexing the conductive strip 330 away from the force sensitive resistor 332 due to the expansion of the disc 452 back to its pre-force shape in step 910. In this case, the force sensitive resistor 332, the disc 452, the plunger 420, and the tip 109 may return to their respective quiescent states (i.e., if the release/unloading of the force results in no force being applied to the tip 109).

Next, in step 912, a pressure level corresponding to the applied (or released) force is determined. As shown in FIG. 9, step 912 can comprise measuring an output voltage of a circuit including components of the pressure sensor 300. This step can determine one of over a thousand of levels of pressure by measuring one of over a thousand of minute, discrete resistance changes exhibited by the force sensitive resistor 332.

In optional step 916, a current pressure level and pressure status is determined and indicated. According to embodiments, this step can comprise determining pressure statuses such as those shown in FIG. 9. For example, in addition to determining a pressure level from among thousands of potential pressure levels, statues such as decreasing pressure, increasing pressure, static pressure (no change vis-à-vis a prior pressure level), relatively stable pressure (gradual ramp up or ramp down), and quiescent/no pressure. The determined status and pressure level can be communicated to a touch computing device in step 916.

After the determined pressure level and/or status has been determined and indicated, control is passed to step 918 where the method ends.

In certain embodiments, (not shown), step 916 can be performed during execution of step 914. For example, by performing step 916 in parallel with or as part of step 914, a current pressure level and/or pressure status can be indicated while a current pressure level is being determined.

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A stylus comprising:
   a tip configured to receive a mechanical force when contacting a touch surface of a computing device, wherein the tip is configured to deform in response to receiving the mechanical force;
   a plunger connected to the tip and adapted to move in directions substantially perpendicular or tangential to the touch surface of the computing device in response to the tip receiving the mechanical force;
   a force sensitive resistor configured to vary resistance in an electrical circuit based on the force;
   a fastener attached to an end of the plunger distal from the tip and comprising an electrically conductive nut configured to removably secure the plunger and distribute the force received by the tip substantially evenly across the force sensitive resistor; and
   a component configured to determine an amount of pressure corresponding to the force or a change in an amount of pressure based on the resistance in the electrical circuit.

2. The stylus of claim 1 further comprising an elongated housing, the plunger further configured to
   ground the tip to the elongated housing.

3. The stylus of claim 2 further comprising a nozzle disposed between the tip and the elongated housing, the nozzle comprising a charging contact, the charging contact electronically isolated from the tip, the plunger, and the force sensitive resistor.

4. The stylus of claim 1, wherein the tip comprises one or more of synthetic rubber and natural rubber materials.

5. The stylus of claim 1, wherein:
the stylus is a pressure sensitive stylus;
the tip is a capacitive tip; and
the fastener has a width or diameter substantially similar to a width or diameter of a disc positioned at the end of the plunger distal from the tip.

6. The stylus of claim 1, further comprising a nozzle housing including a substantially cylindrical chamber encasing a portion of the plunger between the tip, the nozzle housing being coupled to a body of the stylus, wherein the nozzle housing is tapered such that it is narrower at an end of the nozzle housing proximate to the tip than at another end of the nozzle housing proximate to the body.

7. The stylus of claim 1, further comprising:
a base insulator disposed between a body of the stylus and the tip, the base insulator having an opening adapted to accept the plunger, the opening forming at least a portion of a chamber encasing at least a portion of the plunger.

8. The stylus of claim 1, wherein the component comprises circuitry configured to measure a degree of the transferred at least the portion of the force based at least in part on a change in output voltage of a circuit comprising the force sensitive resistor.

9. The stylus of claim 1, wherein the plunger is positioned within a chamber in the stylus, the stylus further comprising:
a disc in contact with the fastener at an end of the plunger distal from the tip, the disc exhibiting resiliency and electrical conductivity, the disc configured to compress in response to the plunger moving in the direction away from the tip; and
a conductive strip disposed between the disc and the force sensitive resistor, the conductive strip being configured to apply pressure corresponding to the transferred at least the portion of the force against the force sensitive resistor in response to compression of the disc.

10. The stylus of claim 9, wherein:
the plunger is further configured to move in the chamber in another direction towards the tip in response the force being released at the tip;
the disc is further configured to expand in response to the plunger moving in the another direction;
the conductive strip is further configured to unload the transferred at least the portion of the force from the force sensitive resistor by releasing the pressure from the force sensitive resistor in response to expansion of the disc; and
the component comprises circuitry configured to measure a degree of the unloaded at least the portion of the force based at least in part on a change in output voltage of a circuit comprising the plunger, the disc, the force sensitive resistor, and the conductive strip in response to the pressure applied via the conductive strip.

11. The stylus of claim 9, further comprising:
a nozzle housing encasing a portion of the plunger between the tip and a body of the stylus, coupled to a surface of a body housing encasing the body, the body housing having an opening adapted to receive the plunger, wherein the nozzle housing includes at least a portion of the chamber, the chamber being a substantially cylindrical chamber adapted to allow substantially free movement of the plunger in directions that are substantially perpendicular to the disc.

12. The stylus of claim 9, wherein the disc comprises a conductive rubber material.

13. The stylus of claim 9, wherein the plunger includes a flange at the end of the plunger distal from the tip, the flange having a width or diameter substantially similar to a width or diameter of the disc and wherein plunger comprises a conductive metal or alloy.

14. A method for determining a pressure level corresponding to a mechanical force, the method comprising:
transferring at least a portion of the force from a tip to a pressure sensor, the tip configured to deform in response to receiving the force and being connected to a plunger disposed within a chamber having a resilient disc disposed at an end of the chamber that is distal from the tip, the plunger including a removably securable fastener attached to an end of the plunger distal from the tip and further being configured to move within the chamber to compress the disc in response to the force being applied to the tip, the transferring comprising:
deforming the tip, thereby moving the plunger to employ the fastener to press on the disc;
compressing the disc in response to the pressing, thereby changing resistance of a circuit including: a force sensitive resistor disposed on a side of the disc opposite from the plunger; and a conductive strip disposed between the force sensitive resistor and the disc, the conductive strip being configured to apply pressure corresponding to the transferred at least the portion of the force against the force sensitive resistor in response to compression of the disc; and
measuring a level of the force in terms of the resistance exhibited by the force sensitive resistor in response to the compressing.

15. The method of claim 14, further comprising:
imposing, in a quiescent state, substantially no static preload on the disc by the plunger.

16. A stylus comprising:
a pressure sensitive tip configured to interact with a touch surface of a computing device, the tip being at an end of the stylus and configured to deform upon receiving a force from the touch surface;
a body encased in a body housing;
a nozzle assembly coupled to the body, the nozzle assembly including a chamber surrounding at least a portion of a slide-able plunger connected to the tip at the end of the stylus, the plunger being adapted to move in directions substantially perpendicular or tangential to the touch surface of the computing device when the force is applied to deform the tip; and
a pressure sensor including:
a force sensitive resistor disposed on a nonconductive surface at an end of the chamber that is distal from the tip, a side of the force sensitive resistor facing the chamber, the force sensitive resistor being configured to alter its resistance in response to a change in mechanical pressure applied thereto;
a conductive strip disposed on the side of the force sensitive resistor facing the chamber, the conductive strip being electrically connected to the body housing;
a disc disposed on the conductive strip such that a surface of the disc is facing the chamber, the disc comprising an electrically conductive, resilient material configured to deform in response to pressure applied by the plunger; and a fastener attached to an end of the plunger distal from the tip, wherein the fastener comprises an electrically conductive nut configured to removably secure the plunger and distribute the pressure applied by the plunger substantially evenly across the surface of the disc.

* * * * *